(12) United States Patent
Deodhar et al.

(10) Patent No.: US 12,038,738 B2
(45) Date of Patent: Jul. 16, 2024

(54) METHOD AND SYSTEM FOR MONITORING AND OPTIMIZING THE OPERATION OF AN ALUMINA ROTARY KILN

(71) Applicant: Tata Consultancy Services Limited, Mumbai (IN)

(72) Inventors: Anirudh Makarand Deodhar, Pune (IN); Ashit Gupta, Pune (IN); Sivakumar Subramanian, Pune (IN); Venkataramana Runkana, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 376 days.

(21) Appl. No.: 17/593,442

(22) PCT Filed: Mar. 28, 2020

(86) PCT No.: PCT/IB2020/052978
§ 371 (c)(1),
(2) Date: Sep. 17, 2021

(87) PCT Pub. No.: WO2020/188549
PCT Pub. Date: Sep. 24, 2020

(65) Prior Publication Data
US 2022/0179400 A1    Jun. 9, 2022

(30) Foreign Application Priority Data

Mar. 20, 2019   (IN) .............................. 201921010963

(51) Int. Cl.
G05B 19/4155   (2006.01)
H04L 67/12     (2022.01)

(52) U.S. Cl.
CPC .......... *G05B 19/4155* (2013.01); *H04L 67/12* (2013.01); *G05B 2219/45132* (2013.01)

(58) Field of Classification Search
CPC ...... G05B 19/4155; G05B 2219/45132; G05B 13/048; G05B 17/02; H04L 67/12
See application file for complete search history.

(56) References Cited

U.S. PATENT DOCUMENTS 7,551,982 B2    6/2009  Hammerling
9,382,600 B2 *  7/2016  Boudreault ............... C22B 3/44
(Continued)

FOREIGN PATENT DOCUMENTS

CN    100348939 C  * 11/2007
CN    103966468 A  *  8/2014
(Continued)

OTHER PUBLICATIONS

International Search Report and Written Opinion mailed Feb. 17, 2021, in International Application No. PCT/IB2020/52978; 10 pages.

*Primary Examiner* — Eyob Hagos
(74) *Attorney, Agent, or Firm* — Finnegan, Henderson, Farabow, Garrett & Dunner, LLP (57) ABSTRACT

The ability to comprehend the context of a given programming artifact and extracting the underlying functionality is a complex task extending beyond just syntactic and semantic analysis of code. All existing automation capabilities, hence heavily depend on manual involvement of domain experts. Even recent approaches leveraging Machine Learning Capabilities are supervised techniques, whereby the dependency on domain experts still remains—in preparing suitable training sets. A method and system for automated classification of variables using unsupervised distribution agnostic clustering has been provided. The present disclosure focuses to tap the flexibility of the code and presents a domain agnostic approach using unsupervised machine learning which automatically extracts the context from source code, by classifying the underlying elements of the code. The method and (Continued)

system do not require any manual intervention and opens a wide range of opportunities in reverse engineering and variable level analysis space.

19 Claims, 6 Drawing Sheets

(56) References Cited

U.S. PATENT DOCUMENTS

| | | | | |
|---|---|---|---|---|
| 10,005,669 B2 * | 6/2018 | Hou | ............. | F27B 7/20 |
| 2011/0002086 A1 * | 1/2011 | Feaver | ............. | H01G 11/32 |
| | | | | 252/511 |
| 2012/0081838 A1 * | 4/2012 | Costantino | ............. | H01G 11/42 |
| | | | | 252/502 |
| 2015/0315442 A1 * | 11/2015 | Hofius | ............. | C01G 45/1242 |
| | | | | 51/308 |

FOREIGN PATENT DOCUMENTS

| | | | | |
|---|---|---|---|---|
| CN | 103092171 B | 6/2015 | | |
| CN | 105021030 A | 11/2015 | | |
| EP | 1228016 B1 | 3/2005 | | |
| EP | 1228015 B1 * | 10/2007 | ............. | C03C 17/002 |
| WO | WO2018065661 A1 | 4/2018 | | |
| WO | WO2019/209156 A1 | 10/2019 | | |

* cited by examiner

METHOD AND SYSTEM FOR MONITORING AND OPTIMIZING THE OPERATION OF AN ALUMINA ROTARY KILN

CROSS-REFERENCE TO RELATED APPLICATIONS AND PRIORITY

This application is a US National Stage Filing and claims priority from International Application No. PCT/162020/052978, filed on Mar. 20, 2020, which application claims priority from Indian Provisional Patent Application No. 201921010963, filed on Mar. 20, 2019. Entire contents of the aforementioned applications are incorporated herein by reference.

TECHNICAL FIELD

The disclosure herein generally relates to the field of optimization of alumina rotary kiln, and, more particularly, to the method and system for real-time monitoring and optimizing the operation of the alumina rotary kiln using a digital twin of the same.

BACKGROUND

A rotary kiln is a pyro-processing device used to raise materials to a high temperature (calcination) in a continuous process. Typically, coal, oil, natural gas or coke are used as fuels for generating the heat required. The type of fuel may vary based on kiln design and operating cost constraints. Typically, kilns are one of the most critical and energy intensive equipment in a manufacturing plant. Some of the typical challenges faced by the kiln operator are, inconsistent product quality due to inherently dynamic operation, impurities in raw material, refractory erosion, material deposition among others.

In an alumina processing rotary kiln, Aluminum hydroxide $(Al(OH)_3)$ is the raw material calcined to form alumina $(Al_2O_3)$. The material is initially mixed with water and the slurry is subjected to heat produced by firing the fuel while undergoing a rotational motion inside the alumina rotary kiln. The final material is received at the end of the kiln and is further cooled down typically in a rotary cooler. The output quality of alumina is typically measured in terms of a parameter called specific surface area (SSA), which is a characteristic of the alumina phase concentrations present in the final product.

Different applications of alumina lead to requirement of producing different grades of alumina using the same kiln. This is challenging for several reasons. The most common challenge is the absence of real-time monitoring of product quality. SSA or any other product quality parameters are typically not measured online in real-time. The lab measurements often have delay of hours which forces the kiln operation to be partially blind before the quality could be assessed. This results in fluctuations in product quality and large rejects.

Further, there is always variations in fuel quality, kiln conditions and ambient conditions, which result in fluctuating kiln operation. The operation of alumina rotary kiln involves complex phenomena and multiple parameters. The product quality depends upon a complex interplay of multiple parameters such as fuel quality, air distribution, raw material quality, kiln condition, residence time of material and so on. In view of above challenges, the onus falls completely on the operator expertise to achieve the desired product quality, resulting in quality variations and hence financial loss.

The existing control systems in plants are typically consider ideal and design conditions, hence not suitable for continuously changing conditions and requirements. In addition, advanced sensors and high frequency infrared cameras are typically very expensive.

SUMMARY

Embodiments of the present disclosure present technological improvements as solutions to one or more of the above-mentioned technical problems recognized by the inventors in conventional systems. For example, in one embodiment, a system for real-time monitoring and optimizing the operation of an alumina rotary kiln is provided. The system comprises an input/out interface, one or more hardware processors and a memory. The input/output interface receives real-time data of the alumina rotary kiln, via a plurality of sources. The memory is in communication with the one or more hardware processors. The memory further comprises a preprocessor, a temperature prediction unit, an alumina quality prediction unit, and an optimum parameter identification unit. The preprocessor pre-processes the received real-time data. The temperature prediction unit predicts a gas and a solid temperature profile in the alumina rotary kiln over a predefined time period using the preprocessed real time data and a thermal model stored in a database. The alumina quality prediction unit predicts a quality of alumina in real-time in terms of a set of quality parameters using the predicted gas and solid temperature profile, preprocessed real time data and a quality model. The optimum parameter identification unit identifies an optimum set of parameters by satisfying a predetermined criterion based on a set of desired quality parameters, wherein the set of desired quality parameters for the quality of alumina are received from a user. The display device displays the identified optimum set of parameters on the display device, and the real-time predicted quality of alumina on a display device.

In another aspect, a method for real-time monitoring and optimizing the operation of an alumina rotary kiln is provided. Initially, real-time data of the alumina rotary kiln is received, via a plurality of sources. The received real-time data is then preprocessed. Further, a gas and a solid temperature profile in the alumina rotary kiln is predicted over a predefined time period using the preprocessed real time data and a thermal model stored in a database. A quality of alumina in real-time is also predicted in terms of a set of quality parameters using the predicted gas and solid temperature profile, preprocessed real time data and a quality model. At next step, the real-time predicted quality of alumina is displayed on a display device. Further, a set of desired quality parameters is received for the quality of alumina from a user. Further, an optimum set of parameters are identified by satisfying a predetermined criterion based on the received set of desired quality parameters. And finally, the identified optimum set of parameters are displayed on the display device.

In yet another aspect, one or more non-transitory machine readable information storage mediums comprising one or more instructions which when executed by one or more hardware processors cause real-time monitoring and optimizing the operation of an alumina rotary kiln is provided. Initially, real-time data of the alumina rotary kiln is received, via a plurality of sources. The received real-time data is then preprocessed. Further, a gas and a solid temperature profile in the alumina rotary kiln is predicted over a predefined time period using the preprocessed real time data and a thermal model stored in a database. A quality of alumina in real-time is also predicted in terms of a set of quality parameters using the predicted gas and solid temperature profile, preprocessed real time data and a quality model. At next step, the real-time predicted quality of alumina is displayed on a display device. Further, a set of desired quality parameters is received for the quality of alumina from a user. Further, an optimum set of parameters are identified by satisfying a predetermined criterion based on the received set of desired quality parameters. And finally, the identified optimum set of parameters are displayed on the display device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 5B, where similar reference characters denote corresponding features consistently throughout the figures, there are shown preferred embodiments and these embodiments are described in the context of the following exemplary system and/or method.

Figure 1:
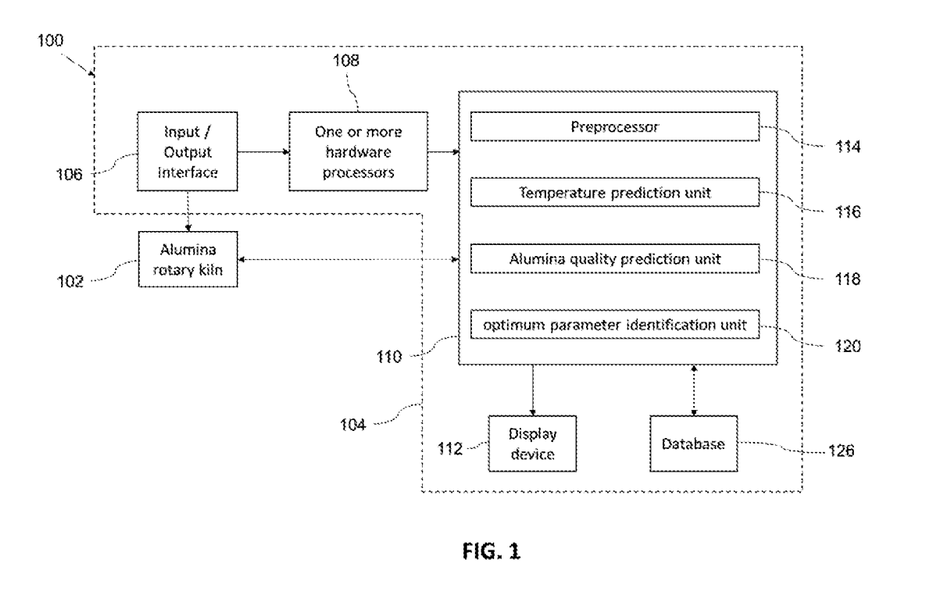
FIG. 1 illustrates a block diagram of a system for real-time monitoring and optimizing the operation of an alumina rotary kiln according to some embodiments of the present disclosure.

According to an embodiment of the disclosure, a system 100 for real-time monitoring and optimizing the operation of an alumina rotary kiln 102 is shown in the block diagram of FIG. 1. The system 100 is utilizing a digital twin 104 of the alumina rotary kiln 102 for real-time monitoring, controlling and optimization of a plurality of process parameters of the alumina rotary kiln 102 through automatic learning and diagnosis as shown in the schematic diagram of FIG. 2. The digital twin 104 of the alumina rotary kiln 102 can monitor the operation in real-time by soft sensing unmeasured/unavailable parameters. And further configured to optimize the operation in real-time based on the product quality requirements, fuel changes, kiln conditions and ambient variations. It should be appreciated that the words alumina rotary kiln and kiln can be used interchangeably in the disclosure.

According to an embodiment of the disclosure, the system 100 comprises an input/output interface 106, one or more hardware processors 108, a memory 110 in communication with the one or more hardware processors 108 and a display device 112 as shown in the block diagram of FIG. 1. The one or more hardware processors 108 work in communication with the memory 110. The one or more hardware processors 108 are configured to execute a plurality of algorithms stored in the memory 110. The memory 110 further includes a plurality of modules for performing various functions. The memory 110 further comprises a preprocessor 114, a temperature prediction unit 116, an alumina quality prediction unit 118, and an optimum parameter identification unit 120.

According to an embodiment of the disclosure, the input/output interface 106 is configured to receive real-time data of the alumina rotary kiln 102 via a plurality of sources. The plurality of sources may comprise of distributed control system (DCS), historian, Laboratory information management system (LIMS), manufacturing execution systems (MES) and manual input. The data from the plurality of sources is received and processed in real-time or near real-time to provide actionable insights. The real time data comprise of real-time operation data from sensors, product quality and material property measurements from the laboratory, ambient conditions and maintenance and design information. The input/output interface 106 is accessible to the user via smartphones, laptop or desktop configuration thus giving the user the freedom to interact with the system 100 from anywhere anytime. The input/output interface 106 may include a variety of software and hardware interfaces, for example, interfaces for peripheral device(s), such as a keyboard, a mouse, an external memory, a camera device, and a printer. The input/output interface 106 can facilitate multiple communications within a wide variety of networks and protocol types, including wired networks, for example, local area network (LAN), cable, etc., and wireless networks, such as Wireless LAN (WLAN), cellular, or satellite.

Figure 2:
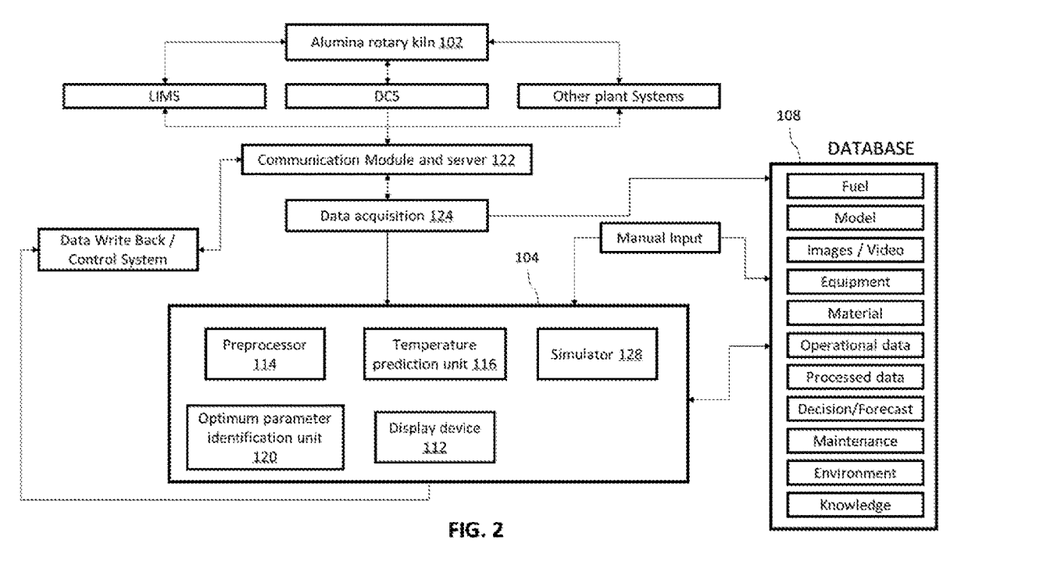
FIG. 2 is a schematic block diagram of the system of FIG. 1 according to some embodiments of the present disclosure.

According to an embodiment of the disclosure, the system 100 also comprises a data communication unit and server 122 that communicates with a plurality of sources to seamlessly extract data related to current operational status of the alumina rotary kiln 102. Further, a data acquisition unit 124 retrieves and stores the extracted data in a database 126. The database 126 may store the data categorized as data related various parameters and conditions. The database 126 may include following databases. A fuel database for storing fuel information. A model database for storing prediction and optimization models and their metadata. An equipment database for storing the equipment design and specifications. A material database for storing information about specifications/properties of materials used in the kiln such as Alumina/Aluminum hydroxide/refractory/shell/water/air. An operation data database for storing the data received from sensors and manual inputs about the plant operation. A processed data database for storing the data processed by the digital twin 104 such as cleaned data, predicted values of parameters as well as additional insights obtained such as operating regime identified, raw material clusters identified, anomalies in data and so on. A decision/Forecast database for storing outcomes of optimization and prediction models. A maintenance database for storing equipment and plant maintenance schedule and information. An environment database for storing ambient related information and forecasts that affect the plant. A knowledge database for storing operator knowledge in terms of thumb rules, operation guidelines, failure model analysis rules. Thus, the database 126 maintains a history of extracted, processed and generated data.

According to an embodiment of the disclosure, the memory 110 comprises the preprocessor 114. The preprocessor 114 is configured to preprocess the received real-time data. The preprocessor 114 receives the real-time operation data from the alumina rotary kiln 102 and does a set of operations on top of it in real-time. The preprocessor 114 synchronizes the data coming from the plurality of sources at different frequencies, cleans the data by removing outliers based on outlier removal model, augments the removed data by imputation model and transforms the data based on a transformation model. The transformation of data may involve processing the data at a certain frequency, numerical transformation and regime-based separation of the data. The regimes may be identified based on fuel quality or product quality or operating conditions. The processed data is further stored in the database 126 for re-use.

According to an embodiment of the disclosure, the memory 110 comprises the temperature prediction unit 116. The temperature prediction unit 116 is configured to predict a gas and a solid temperature profile at preselected locations in the alumina rotary kiln 102 over a predefined time period using the preprocessed real time data and a thermal model stored in the database 126. The prediction of gas and solid thermal profile comprises of spatial distribution of temperature within the alumina rotary kiln axially and radially and temperatures in the refractory and the shell of the alumina rotary kiln 102.

Figure 3:
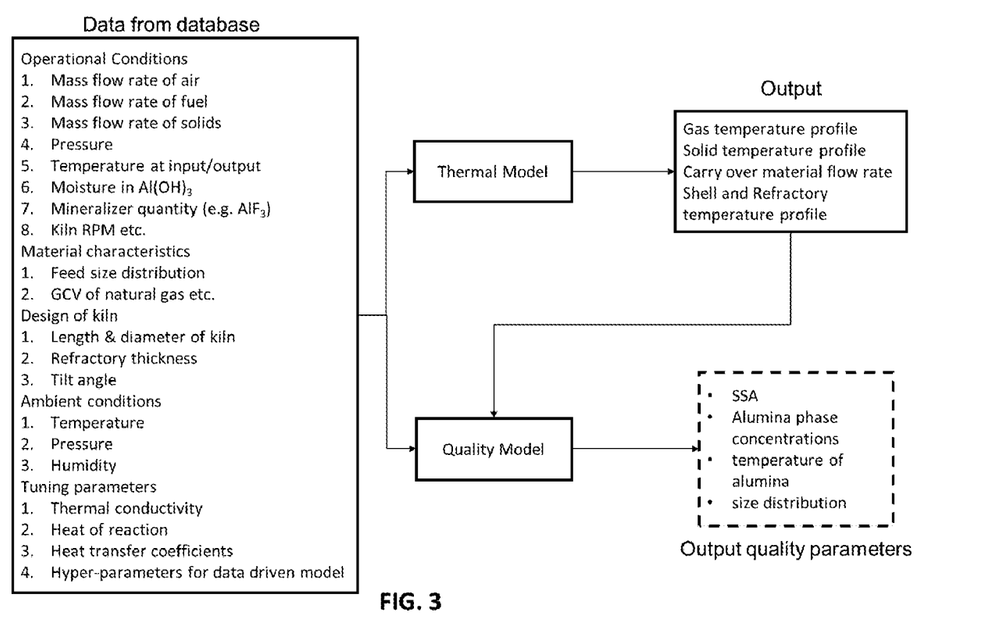
FIG. 3 illustrates a model configuration of a thermal model and a quality model in accordance with some embodiments of the present disclosure.

The thermal model may comprise of first principles driven model, data-driven model or a knowledge driven model as shown in FIG. 3. As an example, the thermal model may comprise of a first principles based model that predicts the thermal map of the alumina rotary kiln 102 in real-time based on mass-momentum and energy balance equations with tuning parameters such as heat transfer coefficient and kinetics. The thermal model may either be a computational fluid dynamics type of model or a reduced order model as well.

As an example of a predictive model, a one dimensional first principle-based model is used which accounts for the dynamic nature of material flow and gas flow inside the alumina rotary kiln 102, heat transfer between solid, gas and wall, heat transfer from refractory to shell and tracks changes in concentration of species in the gas. In such a model, a system of ODE's and algebraic equations are solved, ensuring the results are obtained in real time/near real time. The inputs to the model are operational conditions, design and material characteristics, ambient conditions and tuning parameters. The operating conditions comprise of mass flow rates for the raw material, distribution of air and its pressures, the rate of firing and so on. The other inputs such as calorific value, composition and properties of the fuel used, size distribution of the alumina hydrate as well as its moisture content may also be considered. The design parameters such as dimensions of the alumina rotary kiln 102, cooler and other equipment along with the rotational speed and tilt angle of the alumina rotary kiln 102 are also considered as input to the model. The effect of ambient conditions is taken into account through ambient temperature, pressure and humidity. The model would predict the gas temperature profile across the length of the kiln, solid temperature profile and mass flow rate of the material carried over upstream. The model may need tuning in order to accurately predict the outputs. The tuning could be done based on historical data of the plant or based on process knowledge. The tuning parameters may comprise of heat transfer coefficients, chemical kinetic parameters as well as parameters indicating kiln accretion or deposition conditions.

The system 100 is further configured to check accuracy of predicted gas and solid temperature profile. An actual measurement of the gas and solid temperature is calculated at the preselected locations in the alumina rotary kiln using a set of sensors. The set of sensors may be physical sensor or soft sensors. Further, the predicted gas and solid temperature profile is compared with the actual measurements of the gas and solid temperature to check the accuracy of the predictions over the predefined time period. And then a set of tuning parameters are manipulated such that the accuracy of the prediction comes to an acceptable range based on a first predefined condition. The set of tuning parameters are manipulated by the user.

Figure 4:
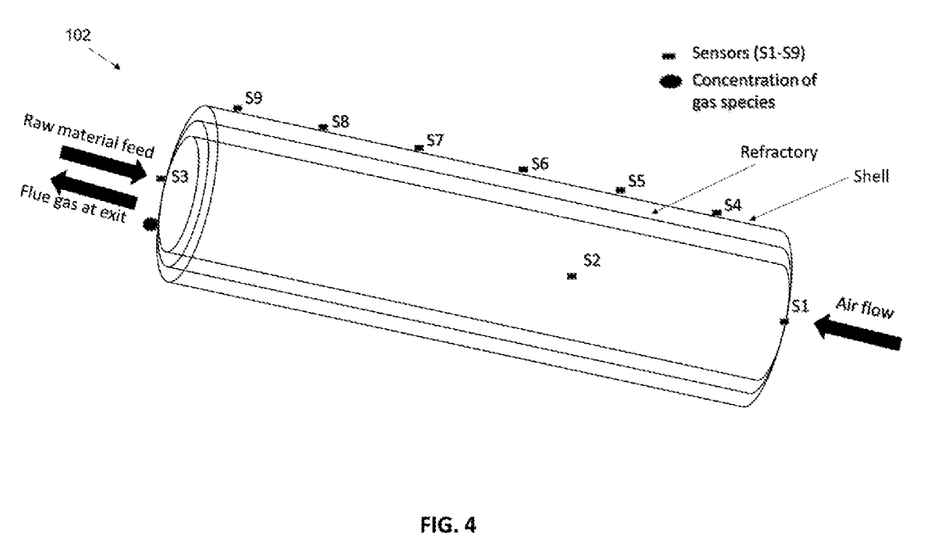
FIG. 4 is a schematic representation of placement of plurality of sensors present in the alumina rotary kiln according to some embodiments of the present disclosure.

As an example, since the temperature measurements inside the kiln are not available real-time, the temperature measurements at the shell, at ends of the kilns, burning zone temperature and concentration of various species at exit as shown in FIG. 4 of the kiln could be used for model accuracy check. The accuracy can be measured by computing root mean square error (RMSE) over a time period Tt for all the possible sensors.

If the accuracy of the model is not found to be sufficiently accurate, the model self-learning is triggered. The performance of the model may deviate from the real kiln because of several factors such as degradation of kiln refractory, aging of kiln shell and other upstream equipment, changing raw material characteristics, modifications in fuel properties as well as ambient variations. In order to adjust to these changes, model tuning is done by manipulating the tuning parameters until the difference between predicted outputs and actual measurements at selected locations is within acceptable range. For example, heat transfer and kinetic parameters of the thermal model are tuned until the difference between shell temperature, concentration of species in prediction and sensor measurement is below the acceptable limit for a time period of $T_t$.

According to an embodiment of the disclosure, the memory 110 comprises the alumina quality prediction unit 118. The alumina quality prediction unit 118 is configured to predict the quality of alumina in real-time in terms of a set of quality parameters using the predicted gas and solid temperature profile and a quality model. The actual quality of alumina coming out of the alumina rotary kiln 102 is also measured to compare with the predicted quality of alumina.

The quality model may comprise of first principles driven model, data-driven model or a knowledge driven model. As an example, quality model may comprise of a data-driven model (machine learning, deep learning, reinforcement learning) that predicts the quality of alumina based on the inputs as shown in FIG. 3. The model outputs may comprise of SSA, alumina phase concentrations, temperature of alumina and size distribution for example. The model inputs comprise of kiln operating conditions, design parameters, ambient conditions as well as the tuning parameters. One unique feature of the quality model is that the outputs, i.e., soft sense temperature profiles from the thermal model are used as inputs in real-time for the prediction to be accurate.

The quality of the product in the alumina rotary kiln depends on the overall temperature that alumina gets subjected to at various parts of the kiln as well as the residence time of the alumina at different positions in the kiln. Therefore, providing the real-time temperature profile as input along with the rest of the kiln operating conditions is vital for predicting the alumina quality accurately. Slight changes in the temperature profile on account of changes in external/internal factors results in large deviation in the quality of alumina produced.

The accuracy of the hybrid quality model is checked against the actual lab measurements of quality obtained over a period $T_q$ in the past. The predicted values of quality are compared against the recorded values of quality at several times in the period $T_q$. If the error between the two is below acceptable limit, model is considered valid for the current conditions. If not acceptable, the quality model is tuned again for the current data. The quality model is retuned by identifying the right set of hyper-parameters, right set of training data or right set of tuning parameters so that the difference between predicted quality and lab/sensor measurement is within acceptable limits. This is done by using the operating condition data, design data, ambient condition data as well as measured lab data for quality over a period $T_q$ or more.

According to an embodiment of the disclosure, the memory 110 comprises the optimum parameter identification unit 120. The optimum parameter identification unit 120 is configured to identify an optimum set of parameters by satisfying a predetermined criterion based on a set of desired quality parameters, wherein the set of desired quality parameters for the quality of alumina are received from the user. The recommended operation setting may comprise of feed rate, primary and secondary air distribution, material additives rate, kiln rotation speed, recirculation feed and fuel firing rate of the alumina rotary kiln 102.

The optimization could be triggered automatically based on the time delay or it can be triggered manually by the operator. The optimum parameter identification unit 120 checks the predicted value of the alumina quality (from a validated model) against desired range of alumina quality set by the operator after a set period. If the deviation is beyond acceptable limit, the optimization loop is triggered.

According to an embodiment of the disclosure, the method for optimization can also be explained with the help of an example scenario. The optimization problem could be formulated as follows—
Objective—To maximize a stability index for a given condition of Disturbance Variables.
The score of the objective function is referred as stability index.
Objective function=function (O, BZT, FET, SSA, C, HI, P, E)
Constraint—SSA in a given limit (0.7-0.8), Health index (HI)<45, NO emission<30 ppm etc.
Disturbance variables (DV's)—moisture at input (M), Granulometry/span of aluminum hydroxide grains (G)
Manipulating variables (MV's)—raw material flowrate (RF), soda/mineralizer flow rate (MF), secondary airflow (SA), Fuel firing rate (FF)
Key performance indicators—Output (O), Burning zone temperature (BZT), Flue gas exit temperature (FET), specific surface area (SSA), Cost (C), Health index (HI), Pollutant emission (P), Efficiency (E)
Key performance indicators=function (MV's, DV's)
Cost affecting variables (C)—power consumption of all systems, material cost, soda/mineralizer cost
Health/safety index (HI)—shell temperatures, accretion rate
Pollutant emission (P)—CO, $CO_2$, $SO_2$, NO
Efficiency—fan efficiency, separator efficiency The optimization function can be Single or multi-objective function. As an example, following is the function that can be used to compute index for stabilizing SSA with a high weightage to health of the kiln.
Stability index=0.35*SSA+0.3*BZT+0.2*HI+0.05*FET+0.05*C+0.02*O+0.02*P+0.01*E According to an embodiment of the disclosure, the system 100 also comprises a simulator 128. The simulator 128 allows the user to do what-if and if-what scenario analysis offline or online by accessing the thermal model and the quality model. For what-if scenario analysis, user may enter values for parameters such as primary and secondary air distribution, kiln rotation speed, fuel flow rate, raw material feed on screen and the simulator 128 may predict the resulting thermal signatures and the product quality parameters (considering the kiln condition and ambient conditions and fuel quality). For if-what scenario analysis, the user may enter the desired quality parameters or thermal signature on screen and the simulator may provide the optimum values for parameters such as primary and secondary air distribution, kiln rotation speed, fuel flow rate, raw material feed to meet the criteria. This helps the operator taking decisions real-time. A simulation can be saved to the database 126 as well the settings could be implemented in the plant for execution in real-time.

Figure 5A:
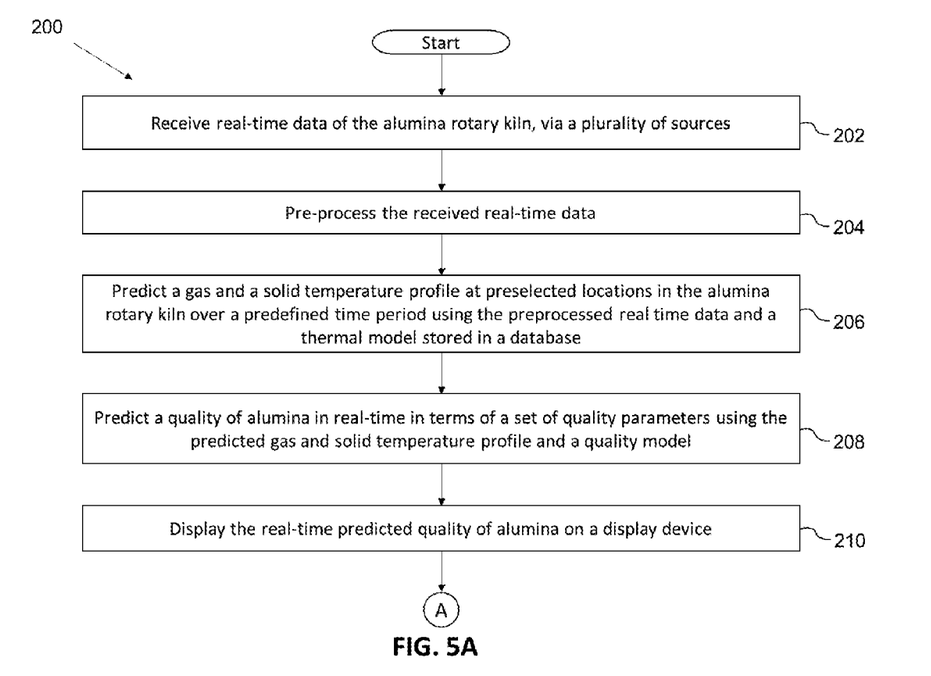
FIGS. 5A and 5B is a flow diagram illustrating real-time monitoring and optimizing the operation of the alumina rotary kiln in accordance with some embodiments of the present disclosure.
Figure 5B:
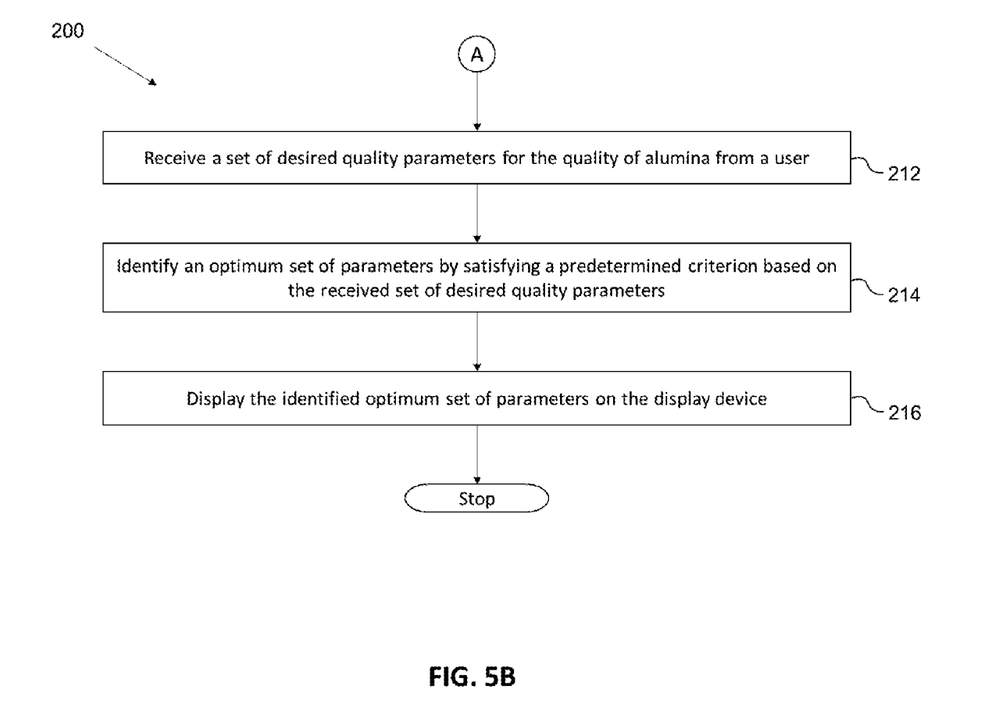

In operation, a flowchart 200 for illustrating the method for real-time monitoring and optimizing the operation of the alumina rotary kiln 102 is shown in FIG. 5A-5B. Initially at step 202, real-time data of the alumina rotary kiln 102 is received via the plurality of sources. At step 204, the received real-time data is preprocessed to clean the real-time data. At step 206, the gas and the solid temperature profile is predicted in the alumina rotary kiln 102 over a predefined time period using the preprocessed real time data and the thermal model stored in the database 126.

At step 208, the quality of alumina is predicted in real-time in terms of a set of quality parameters using the predicted gas and solid temperature profile preprocessed real time data and a quality model. Later at step 210, the real-time predicted quality of alumina is displayed on the display device 112. At step 212, the set of desired quality parameters are provided for the quality of alumina from the user. At step 214, the optimum set of parameters are identified by satisfying a predetermined criterion based on the received set of desired quality parameters. An example of the predetermined criteria is upper and lower limit for the set of alumina quality parameter. And finally, at step 216, the identified optimum set of parameters are displayed on the display device 112.

According to an embodiment of the disclosure, typically, a plant may have more than one alumina rotary kilns. The system 100 also provides a remote monitoring and control system that interfaces with multiple digital twins for each of the individual kilns present in the plant. The knowledge generated, data accumulated and the insights along with information stored in DB such as models, data, insights, fuel properties among others is shared across the entire network. Moreover, the system 100 also provides multi-user access with different levels of authorization and access. The alarms and real-time analytics can also be viewed from a handheld device with proper authorization.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of continuously changing conditions and requirement in the plant and the alumina rotary kiln. The embodiment, thus provides the method and system for real-time monitoring and optimizing the operation of the alumina rotary kiln. Though it should be appreciated that the disclosed optimization method and system can also be used to other types kiln in other applications by a person skilled in the art.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor implemented method for real-time monitoring and optimizing the operation of an alumina rotary kiln in a plant, the method comprising:
   receiving real-time data of the alumina rotary kiln, via a plurality of sources; pre-processing, via one or more hardware processors, the received real-time data;
   predicting, via the one or more hardware processors, a gas and a solid temperature profile in the alumina rotary kiln over a predefined time period using the preprocessed real time data and a thermal model stored in a database;
   predicting, via the one or more hardware processors, a quality of alumina in real-time in terms of a set of quality parameters using the predicted gas and solid temperature profile, the preprocessed real time data and a quality model, wherein the quality model comprises a data driven model using an output of the thermal model to predict the quality of alumina, wherein the quality model is retuned by identifying set of hyper-parameters, set of training data or set of tuning parameters such that difference between a predicted quality and a sensor measurement is within acceptable limits, using the operating condition data, design data, ambient condition data as well as measured lab data for quality over a period $T_q$ or more;
   displaying, via the one or more hardware processors, the real-time predicted quality of alumina on a display device;
   receiving, via the one or more hardware processors, a set of desired quality parameters for the quality of alumina from a user;
   identifying, via the one or more hardware processors, an optimum set of parameters by satisfying a predetermined criterion based on the received set of desired quality parameters, wherein the predetermined criteria is an upper limit and a lower limit for the set of alumina quality parameters,
   wherein optimization is triggered automatically based on a time delay and checks predicted value of the alumina quality against desired range of alumina quality set by an operator after a set period, and when a deviation is beyond an acceptable limit, an optimization loop is triggered;

displaying, via the one or more hardware processors, the identified optimum set of parameters on the display device;

predicting, by a simulator, resulting thermal signatures and product quality parameters considering kiln condition and ambient conditions and fuel quality for what-if scenario analysis, upon obtaining values for parameters such as primary and secondary air distribution, kiln rotation speed, fuel flow rate, raw material feed; and providing, by the simulator, optimum values for parameters such as primary and secondary air distribution, kiln rotation speed, fuel flow rate, raw material feed to meet the criteria in if-what scenario analysis, upon obtaining the desired quality parameters or thermal signature on screen, wherein the simulation is saved to the database and settings are implemented in the plant for execution in real-time.

2. The method according to claim 1, wherein the preprocessing comprises one or more of:
checking for erroneous data in the real time data,
removing outliers in the real time data,
imputing new values in place of missing data, or
synchronizing the real time data.

3. The method according to claim 1 further comprising checking accuracy of predicted gas and solid temperature profile:
receiving an actual measurement of the gas and solid temperature at the preselected locations in the alumina rotary kiln using a set of sensors;
comparing the predicted gas and solid temperature profile with the actual measurements of the gas and solid temperature to check the accuracy of the predictions over the predefined time period;
manipulating a set of tuning parameters for thermal model such that the accuracy of the prediction comes to an acceptable range based on a first predefined condition, wherein the set of tuning parameters are manipulated automatically or by the user.

4. The method according to claim 1 further comprising measuring an actual quality of alumina coming out of the alumina rotary kiln to compare with the predicted quality of alumina.

5. The method according to claim 1, wherein the set of quality parameters comprises specific surface area (SSA), alumina phase concentrations, temperature of alumina and size distribution of alumina.

6. The method according to claim 1, wherein the plurality of sources comprises distributed control system, historian, Laboratory information management system and manual input.

7. The method according to claim 1, wherein the prediction of gas and solid thermal profile comprises of spatial distribution of temperature within the alumina rotary kiln axially and radially and temperatures in the refractory and the shell of the alumina rotary kiln.

8. The method according to claim 1, wherein the thermal model comprises of a physics-based solver to predict gas and solid temperature profile in axial direction along with shell temperatures as a function of measured operation data in the plant.

9. The method according to claim 1, wherein the real time data comprise of real-time operation data from sensors, product quality and material property measurements from a laboratory, ambient conditions and maintenance and design information.

10. The method according to claim 1, wherein a recommended operation setting of the set of desired quality parameters comprises of feed rate, primary and secondary air distribution, material additives rate, kiln rotation speed, recirculation feed and fuel firing rate of the alumina rotary kiln.

11. The method according to claim 1, wherein the set of quality parameters comprises specific surface area (SSA), alumina phase concentrations, temperature of alumina and size distribution of alumina.

12. A system for real-time monitoring and optimizing the operation of an alumina rotary kiln in a plant, the system comprises:
an input/output interface for receiving real-time data of the alumina rotary kiln, via a plurality of sources;
one or more hardware processors;
a memory in communication with the one or more hardware processors, wherein the memory further comprises:
a preprocessor for pre-processing the received real-time data,
the one or more hardware processors configured to predict a gas and a solid temperature profile in the alumina rotary kiln over a predefined time period using the preprocessed real time data and a thermal model stored in a database,
the one or more hardware processors configured to predict a quality of alumina in real-time in terms of a set of quality parameters using the predicted gas and solid temperature profile, the preprocessed real time data and a quality model, wherein the quality model comprises a data driven model using an output of the thermal model to predict the quality of alumina, wherein the quality model is retuned by identifying set of hyper-parameters, set of training data or set of tuning parameters such that difference between a predicted quality and a sensor measurement is within acceptable limits, using the operating condition data, design data, ambient condition data as well as measured lab data for quality over a period $T_q$ or more; and
the one or more hardware processors configured to identify an optimum set of parameters by satisfying a predetermined criterion based on a set of desired quality parameters, wherein the set of desired quality parameters for the quality of alumina are received from a user; and a display device for displaying the identified optimum set of parameters on the display device, wherein the predetermined criteria is an upper limit and a lower limit for the set of alumina quality parameters, wherein optimization is triggered automatically based on a time delay and checks predicted value of the alumina quality against desired range of alumina quality set by an operator after a set period, and when a deviation is beyond an acceptable limit, an optimization loop is triggered;
the real-time predicted quality of alumina on a display device; and
predict, by a simulator, resulting thermal signatures and product quality parameters considering kiln condition and ambient conditions and fuel quality for what-if scenario analysis, upon obtaining values for parameters such as primary and secondary air distribution, kiln rotation speed, fuel flow rate, raw material feed; and provide, by the simulator, optimum values for parameters such as primary and secondary air distribution, kiln rotation speed, fuel flow rate, raw material feed to meet the criteria in if-what scenario analysis, upon obtaining the desired quality parameters or thermal signature on screen, wherein the simulation is saved to the database and settings are implemented in the plant for execution in real-time.

13. The system according to claim 12 further configured to check accuracy of predicted gas and solid temperature profile:
receiving an actual measurement of the gas and solid temperature at the preselected locations in the alumina rotary kiln using a set of sensors;
comparing the predicted gas and solid temperature profile with the actual measurements of the gas and solid temperature to check the accuracy of the predictions over the predefined time period;
manipulating a set of tuning parameters for thermal model such that the accuracy of the prediction comes to an acceptable range based on a first predefined condition, wherein the set of tuning parameters are manipulated automatically or by the user.

14. The system according to claim 12 further configured to measure an actual quality of alumina coming out of the alumina rotary kiln to compare with the predicted quality of alumina.

15. The system according to claim 12, wherein the plurality of sources comprises distributed control system, historian, Laboratory information management system and manual input.

16. The system according to claim 12, wherein the thermal model comprises of a physics-based solver to predict gas and solid temperature profile in axial direction along with shell temperatures as a function of measured operation data in the plant.

17. The system according to claim 12, wherein the real time data comprise of real-time operation data from sensors, product quality and material property measurements from a laboratory, ambient conditions and maintenance and design information.

18. The system according to claim 12, wherein a recommended operation setting of the set of desired quality parameters comprises of feed rate, primary and secondary air distribution, material additives rate, kiln rotation speed, recirculation feed and fuel firing rate of the alumina rotary kiln.

19. One or more non-transitory machine readable information storage mediums comprising one or more instructions which when executed by one or more hardware processors cause:
receiving real-time data of the alumina rotary kiln, via a plurality of sources;
pre-processing, via one or more hardware processors, the received real-time data;
predicting, via the one or more hardware processors, a gas and a solid temperature profile in the alumina rotary kiln over a predefined time period using the preprocessed real time data and a thermal model stored in a database;
predicting, via the one or more hardware processors, a quality of alumina in real-time in terms of a set of quality parameters using the predicted gas and solid temperature profile, the preprocessed real time data and a quality model, wherein the quality model comprises a data driven model using an output of the thermal model to predict the quality of alumina, wherein the quality model is retuned by identifying set of hyperparameters, set of training data or set of tuning parameters such that difference between a predicted quality and a sensor measurement is within acceptable limits, using the operating condition data, design data, ambient condition data as well as measured lab data for quality over a period $T_q$ or more;
displaying, via the one or more hardware processors, the real-time predicted quality of alumina on a display device;
receiving, via the one or more hardware processors, a set of desired quality parameters for the quality of alumina from a user;
identifying, via the one or more hardware processors, an optimum set of parameters by satisfying a predetermined criterion based on the received set of desired quality parameters, wherein the predetermined criteria is an upper limit and a lower limit for the set of alumina quality parameters,
wherein optimization is triggered automatically based on a time delay and checks predicted value of the alumina quality against desired range of alumina quality set by an operator after a set period, and when a deviation is beyond an acceptable limit, an optimization loop is triggered;
displaying, via the one or more hardware processors, the identified optimum set of parameters on the display device;
predicting, by a simulator, resulting thermal signatures and product quality parameters considering kiln condition and ambient conditions and fuel quality for what-if scenario analysis, upon obtaining values for parameters such as primary and secondary air distribution, kiln rotation speed, fuel flow rate, raw material feed; and
providing, by the simulator, optimum values for parameters such as primary and secondary air distribution, kiln rotation speed, fuel flow rate, raw material feed to meet the criteria in if-what scenario analysis, upon obtaining the desired quality parameters or thermal signature on screen, wherein the simulation is saved to the database and settings are implemented in the plant for execution in real-time.

* * * * *